(12) United States Patent
Reiter (10) Patent No.: US 9,578,809 B2
(45) Date of Patent: Feb. 28, 2017

(54) COLLECTOR FOR COLLECTING HARVESTED MATERIAL

(71) Applicant: Thomas Reiter, Schlüsselberg (AT)

(72) Inventor: Thomas Reiter, Schlüsselberg (AT)

( * ) Notice: Subject to any disclaimer, the term of this patent is extended or adjusted under 35 U.S.C. 154(b) by 0 days.

(21) Appl. No.: 14/428,411

(22) PCT Filed: Sep. 9, 2013

(86) PCT No.: PCT/EP2013/068619
§ 371 (c)(1),
(2) Date: Mar. 16, 2015

(87) PCT Pub. No.: WO2014/040953
PCT Pub. Date: Mar. 20, 2014

(65) Prior Publication Data
US 2015/0230407 A1    Aug. 20, 2015

(30) Foreign Application Priority Data

Sep. 17, 2012   (DE) .................. 10 2012 108 708

(51) Int. Cl.
*A01D 43/02*     (2006.01)
*A01D 87/04*     (2006.01)
*A01D 89/00*     (2006.01)

(52) U.S. Cl.
CPC ........... *A01D 89/004* (2013.01); *A01D 89/002* (2013.01)

(58) Field of Classification Search
CPC ........ A01D 41/14; A01D 57/20; A01D 84/00; A01D 61/002; A01D 43/06; A01D 57/28; A01D 57/12; A01D 89/004
(Continued)

(56) References Cited

U.S. PATENT DOCUMENTS 3,600,878 A * 8/1971 Lynch ................. A01D 57/12
56/119
4,438,619 A * 3/1984 Heim ................. A01D 45/021
56/119
(Continued)

FOREIGN PATENT DOCUMENTS

DE         2753101 A1    7/1978
DE          143496 A1    8/1980
(Continued)

OTHER PUBLICATIONS

International Search Report for PCT/EP2013/068619, dated Feb. 28, 2014, 2 pages.

*Primary Examiner* — Árpád Fábián-Kovács
(74) *Attorney, Agent, or Firm* — Ware, Fressola, Maguire & Barber LLP (57) ABSTRACT

The invention relates to a collector (10) for harvested material having at least three movement devices (12) and at least one yoke (16) interconnecting the movement devices (12). Supporting elements (18) are additionally provided which are connected to the yoke (16) and/or the movement devices (12) and which have a shaft bushing (20) within which a shaft (22) is guided on which pick-up tools (24) for picking up harvested material are mounted. At least one additional movement device (12) is provided between two outer movement devices (12), the yoke (16) being elastically deformed so as to allow a vertical movement—with respect to the yolk axis—of the additional movement device (12) relative to said outer movement devices (12).

16 Claims, 6 Drawing Sheets

(58) Field of Classification Search
USPC .................................. 56/350, 366, DIG. 21
See application file for complete search history.

(56) References Cited

U.S. PATENT DOCUMENTS

| | | | |
|---|---|---|---|
| 4,464,890 A | | 8/1984 | Scholtissek et al. |
| 4,926,625 A | * | 5/1990 | Laquerre ................ A01D 84/00 56/366 |
| 5,203,154 A | * | 4/1993 | Lesher .................. A01D 57/12 56/366 |
| 6,212,865 B1 | * | 4/2001 | Peeters ................. A01D 57/20 56/345 |
| 7,373,769 B2 | * | 5/2008 | Talbot ................... A01D 34/14 56/296 |
| 7,478,521 B2 | * | 1/2009 | Coers .................... A01D 41/14 56/208 |
| 2003/0110752 A1 | * | 6/2003 | Dow ..................... A01D 89/00 56/364 |
| 2003/0213223 A1 | | 11/2003 | Derscheid |
| 2010/0037584 A1 | * | 2/2010 | Dow ..................... A01B 73/02 56/376 |
| 2010/0095646 A1 | * | 4/2010 | Schmidt ................ A01D 41/14 56/14.3 |
| 2011/0154794 A1 | * | 6/2011 | Coers .................... A01D 41/14 56/181 |
| 2013/0177348 A1 | * | 7/2013 | Hyronimus ............ A01D 75/00 403/164 |
| 2014/0260168 A1 | * | 9/2014 | Clark .................... A01D 84/00 56/192 |
| 2014/0290203 A1 | * | 10/2014 | Straeter ................. A01F 15/10 56/341 |
| 2015/0327428 A1 | * | 11/2015 | Landon ................. A01D 57/28 56/228 |
| 2016/0044868 A1 | * | 2/2016 | Bassett ................. A01D 57/20 56/376 |

FOREIGN PATENT DOCUMENTS

| | | |
|---|---|---|
| DE | 91 13 475 U1 | 2/1992 |
| DE | 20 2010 010038 U1 | 2/2011 |

* cited by examiner

COLLECTOR FOR COLLECTING HARVESTED MATERIAL

CROSS REFERENCE TO RELATED APPLICATIONS

This application is a National Stage of PCT International Application no. PCT/EP2013/068619 filed 9 Sep. 2013, which claimed priority in German Patent Application no. 10 1012 108 708.3, filed 17 Sep. 2012, the contents of these documents being incorporated herein by reference.

TECHNICAL FIELD

The invention relates to a collector for harvested material with means for its movement, which picks up the harvested material by means of a rotating shaft which is supported and guided between mounting elements of a frame.

BACKGROUND

In the prior art, rotatable collectors for harvested material, so-called pick-up's, comprise tine bars which are mounted radially around the exterior of a central tube and are connected to the latter. Rotation of said central tube will cause the tines mounted on said tine bars to lift up material to be harvested from the ground and convey it to a collecting area.

Particularly important here is how far the tines are spaced from the ground. In the case of wheel-supported pick-up's, such distance is usually determined and set by means of separate sensing wheels or sensing skids.

Such an array of several shaft segments which are interconnected via rigid frames is disclosed in DE 20 2010 010 038 U1.

DE 91 13 475 U1 discloses a torsionally flexible profile which is mounted on a rigid yoke between two frames and in which the shaft is guided with wheels mounted on the exterior of each frame. Similarly, DD PS 143 496 discloses shaft bushings which are spring-mounted or articulated on a rigid yoke and which are connected to load-bearing skids and support a flexible shaft. Furthermore, strippers are provided which are likewise connected to the shaft and are spring-mounted or articulated on said rigid yoke. As the machine passes uneven ground, this array will cause the tines to be axially displaced relative to the strippers.

However, the disadvantage of these pick-up's is that usually only operating widths of between about 2 to 3 meters can be accomplished without risking considerable dirt ingress or excessive raking losses as the machine travels on uneven ground.

SUMMARY OF THE INVENTION

It is the object of the present invention to improve on the pick-up performance of a collector for harvested material and to accomplish larger operating widths as well as diminished dirt ingress and reduced rake loss.

In a known manner, a collector for harvested material comprises at least three devices for its movement. These movement devices are interconnected via at least one yoke. Furthermore, supporting elements are provided which are connected to the yoke and the movement devices and include a shaft bushing. A shaft is supported and guided in said shaft bushing, which shaft is in turn connected to pick-up tools for collecting harvested material.

According to the invention, the yoke can be elastically deformed so as to allow a relative vertical motion, with respect to the axis of the yoke, of at least one additional movement device which is positioned between the two outer movement devices. The supporting elements mounted on said yoke and/or on said movement devices can likewise be moved relative to each other in a vertical direction, owing to the elastic deformability of said yoke.

In particular, a movement device as defined in the present invention includes a contact surface via which said movement device is guided over the ground contour. The vertical displacement of axially spaced contact surfaces and/or movement causes the yoke to be elastically deformed.

If the shaft is supported in these supporting elements which can be moved relative to each other in a vertical direction, this will allow the distance of the pick-up tools from the ground—which distance is essentially defined by the structural height of the movement device or set by a height adjustor—to be adapted to any changes in the ground contour over the entire width of the collector for harvested material by means of a plurality of segments of such design, without the need for any additional actuators.

The elasticity of the yoke can preferably be designed such that for a yoke of a length of 3 m, it will be possible for the yoke to bend by at least 2 cm at its center in a vertical direction with respect to the yoke axis. Ideal ground contour following is accomplished with an elastic deformation starting from a deflection of at least 4 cm or at least 5 cm for a yoke length of 3 m.

Considered advantageous is a design in which all movement devices are interconnected via a single yoke. This will ensure uniform ground hugging. A particularly simple design is accomplished by forming the yoke as a single piece.

Preferably, the supporting elements and the movement devices are mounted on the yoke in an axial direction thereof without any offset or with little offset only.

In particular, the movement devices are stationary in the axial direction and in the direction of travel. The desired flexibility of the arrangement is determined in particular by the choice of the cross-section and the material of the yoke. Especially the shape and the dimensions of the yoke cross-section are therefore crucial.

The cross-section and the material of the yoke are preferably to be chosen such that a vertical displacement of the movement devices will result in an arc-shaped elastic deformation of the yoke which interconnects the movement devices.

The fact that the shaft, and thus the pick-up tools, are flexibly mounted allows operating widths to be accomplished thanks to the present invention which are a multiple of the operating widths that can be achieved with conventional systems.

The supporting elements are preferably mounted on or adjacent to the movement devices and/or the bearing brackets. This is advantageous in that it ensures improved contour tracking of the soil to be worked.

Besides being mounted on the yoke, the supporting elements may additionally be mounted together with the movement devices or exclusively on the movement devices. This will ensure that radial forces of the shaft can be directly dissipated without affecting the yoke.

Moreover, the collector for harvested material may preferably be designed such that a plurality of pick-up tools is provided between two supporting elements with their shaft bushings.

Besides the supporting elements, so-called strippers may also be provided so as to make it easier to remove the harvested material from the pick-up tools. Said strippers are preferably implemented as single stripper elements and each located between the pick-up tools.

Preferably, at least part of the shaft may be flexible, with the bending lines of yoke and shaft being essentially identical owing to the fact that the shaft is supported by the supporting elements that are connected to the yoke.

Owing to the elastic design of the yoke and the flexible shaft adapted to the latter, the strippers and the pick-up tools will be exposed to the same degree of inclination. The collector can thus be adjusted to and track the ground contour without the danger of the pick-up tools becoming jammed between the strippers since the pick-up tools and the tines will be inclined at the same angle.

Since the stripper elements are likewise individually mounted on the yoke, the flexibility of the yoke will be retained. Moreover, simple maintenance of the pick-up tools merely requires the removal of individual stripper elements.

It is to be noted that the pick-up tools are also individually mounted on the shaft. This allows the shaft to be deformed essentially along the bending line of the yoke, since the deformation of the shaft will not be obstructed by the pick-up tools as these are individually mounted. Consequently, when the ground contours change, the resulting change in the axial distance between the pick-up tools and the strippers can still be kept within narrow limits. This prevents jamming and ensures reliable operation.

In an alternative embodiment, the strippers can also be mounted on the yoke in groups. This facilitates assembly and disassembly and still ensures a certain angular adjustment of the strippers with respect to the pick-up tools.

In yet another advantageous embodiment, the pick-up tools mounted on the shaft may also be mounted thereon in groups. This grouped arrangement will facilitate assembly since the entire group can be mounted all at once in a single working step.

Preferably the size of the pick-up group should be adapted to that of the group of strippers.

Preferably, the supporting elements may also be provided in the form of strippers in order to ensure continuous stripping off of the harvested material from the pick-up tools.

In an embodiment which is considered particularly advantageous the movement devices are provided in the form of skids. This is an especially inexpensive and robust solution, at the same time ensuring a very direct transfer of the ground contours to the yoke. As an alternative, the movement devices may also be provided in the form of wheels or rollers.

If skids are used as a devices for moving the collector, then the yoke can be connected to them via bearing brackets attached to said skids.

Preferably, the yoke is formed as a flat section. Such flat section is flexible both with respect to torsion and in the direction of the small cross-sectional height which is preferably vertically aligned. In the axial direction of the yoke and in the direction of travel, the movement devices can easily be fixed in position with respect to each other on a flat section. The use of a flat section also creates the necessary conditions for a simple and positive-locking assembly of supporting elements and strippers thereon. The flat section notably comprises several layers.

As is common for numerous applications, the pick-up tools take the form of so-called tines, in particular hay-bob tines. A plurality of tines, preferably between 4 and 8, may be mounted on the exterior periphery of a disk so as to co-rotate with the shaft. Attaching the tines to the shaft via a disk allows a reduction in diameter of the drive shaft, thus improving the flexibility of the shaft. At the same time, the length of the tines can be kept relatively short owing to the diameter of the disk, which improves the stability of the tines and increases service life.

A form-locking connection is considered expedient for transferring the rotary motion of the shaft to the pick-up tools. For this purpose, a shaft having a hexagonal or octagonal profile has proven particularly suitable which profile will be accommodated in and enclosed by matching openings in the pick-up tools. If a polygonal shaft is used, the pick-up tools can be mounted offset from each other along the periphery of the shaft, depending on the number of the edges of the shaft.

The pick-up tool may also consist of at least two parts, in which case the connection of said at least two parts will also ensure that the pick-up tool is co-rotationally mounted on the shaft.

Preferably, where plural supporting elements are to be connected, a multi-part shaft can be used. This will additionally increase the flexibility of the collector of harvested material and improve its ground contour following performance. The individual segments of the multi-part shaft may be formed rigid or flexible, depending on their lengths.

The supporting elements may exhibit curved tracks for the angular adjustment of the pick-up tools.

In yet another advantageous embodiment, the collector for harvested material may include a stabilizer which is spaced in or against its direction of travel and which serves to stabilize the movement devices in parallel to the axis of the yoke.

Similar to the yoke, the stabilizer may also be designed to be flexible and take the form of a flat section or a torsion rod.

Preferably, the shaft, the yoke and the stabilizer essentially all extend in the same plane. In yet another advantageous embodiment, the yoke, the shaft and the connecting elements, in particular their mounting points which connect the collector for harvested material to a tractor unit or a loading vehicle, are arranged in one plane.

By arranging the connecting or stabilizing elements, which extend in parallel to the supporting unit and to the shaft, in essentially the same plane as the shaft and the yoke, the collector for harvested material will be optimally stabilized both in its direction of travel and transversely to it, yet still be easily capable of deforming in a vertical direction to follow the ground contours. This will avoid inner stresses, in particular prevent high transverse bearing forces acting on the shaft.

The inventive design considerably reduces the amount of dirt and undesired debris that is usually picked up along with the harvested material since the pick-up tools will only make soil contact in borderline situations. This improvement can even be achieved with large working widths as the individual segments are flexibly mounted with respect to each other between the movement devices for which reason the collector of the invention can adapt to the ground contours even over a large width.

BRIEF DESCRIPTION OF THE DRAWINGS

Further advantages, features and potential applications of the present invention may be gathered from the description which follows, in conjunction with the embodiments illustrated in the drawings.

Throughout the description, the claims and the drawings, those terms and associated reference signs will be used as are notable from the enclosed list of reference signs. The drawings include:

DETAILED DESCRIPTION OF THE INVENTION

Figure 1:
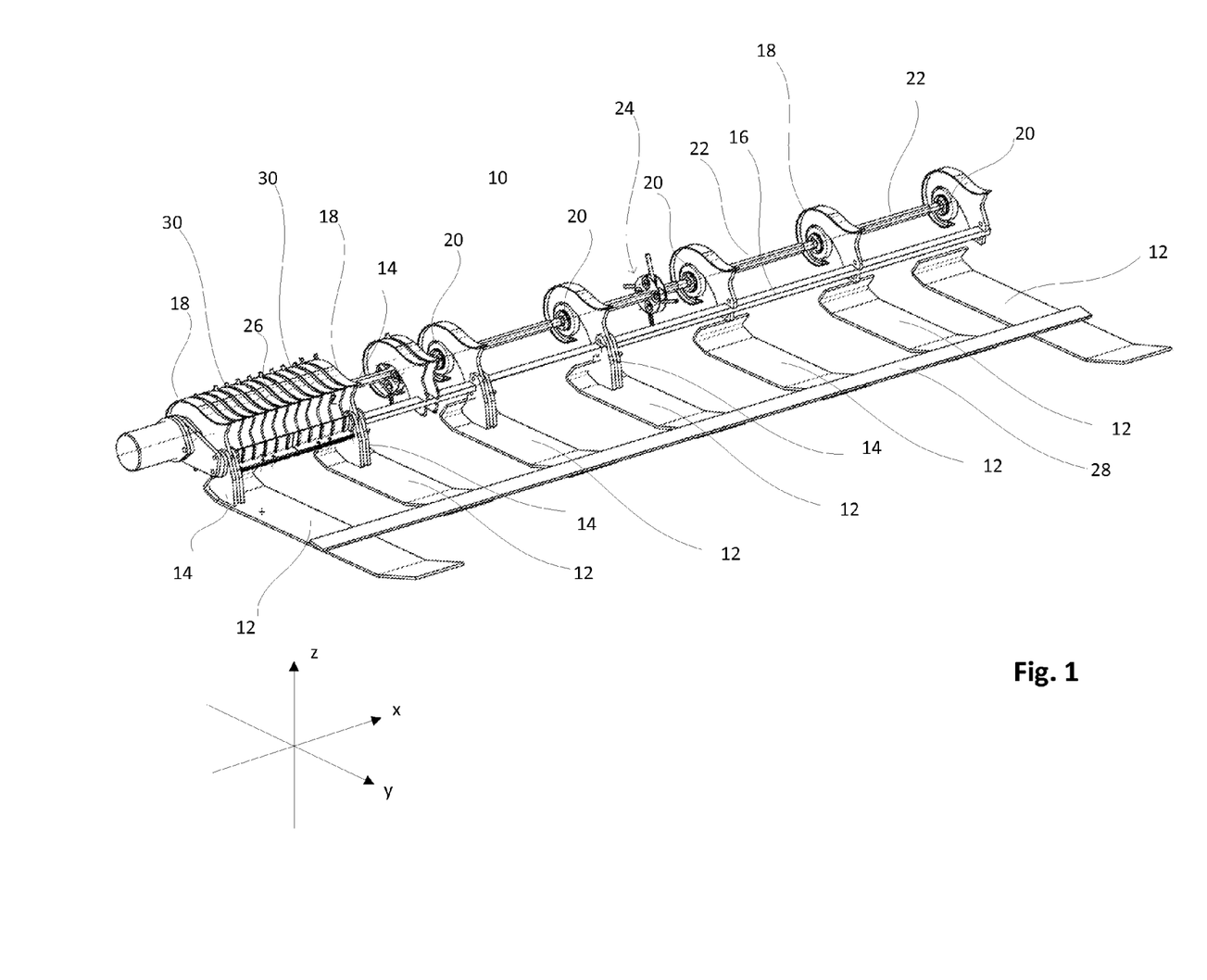
FIG. 1 a perspective partial view of a collector for harvested material according to the present invention.

FIG. 1 shows a collector 10 for harvested material which is equipped with seven skids 12 as devices to facilitate its movement. Each of said skids 12 is connected to a bearing bracket 14. For improved clarity of the illustration, not all bearing brackets 14 for the skids 12 are shown in this drawing. All the bearing brackets 14 of the skids 12 are connected to the yoke 16. The yoke 16, which in this application example takes the form of a flat steel section, ensures that the bearing brackets 14 and the skids 12 can be slid relative to each other in the vertical direction z. In the other directions x and y, the bearing brackets 14 with the skids 12 will essentially remain fixed in position at a defined distance from each other. By providing a certain flexibility of the yoke 16 in the direction z, the skids 12 may be at different height levels at a given time.

Furthermore, supporting elements 18 are provided which are also connected to the bearing brackets 14 and the yoke 16. Naturally, because of this arrangement, the supporting elements 18 will be made to move in the same way as the skids 12 attached to them. Each of said supporting elements 18 contains shaft bushings 20 which rotatably support a driven shaft 22.

For collecting harvested material, pick-up tools 24 with spring-loaded tines are mounted on said shaft 22. The design of the pick-up tools 24 is illustrated in more detail in FIG. 2. As the tines rotate about the shaft 22, they will pick up harvested material from the ground and convey it into a collection zone which is located behind the drive shaft, as seen from the direction of travel. As can be seen in a first segment 26 which is formed between two skids 12, a plurality of pick-up tools 24 is mounted between two supporting elements 18.

For improving the stability of the collector 10 for harvested material, a stabilizer 28 is provided at the rear end of the collector 10, as seen from the direction of travel. This stabilizer 28 interconnects the rear ends of the skids 12 and thus increases the stability of the collector in the x and y directions, but still allows a relative vertical movement of the elements with respect to each other in the direction z.

The cross-section of the stabilizer 28, as well as of the yoke 16, in particular its cross-sectional dimension and cross-sectional shape, and its material have been chosen such that it will be capable of performing this function. A particularly simple design with which this can be achieved is a flat steel section as shown in FIG. 1.

The arrangement according to the invention thus ensures that the individual segments 26 situated between two skids 12 will adapt to any unevenness in the ground contours. In this way, the pick-up tools 24 located between the skids 12 will always be guided at a fixed distance near the ground. As the design of the invention allows a precisely defined distance to be maintained from the ground, dirt ingress and performance losses as a result of the pick-up tools 24 engaging the soil will be avoided.

Strippers 30 are additionally mounted between the pick-up tools 24 so as to ensure that the harvested material picked up by the pick-up tools 24 is conveyed via the shaft 22 to the collection zone of the collector 10 with as little loss as possible. The alternating arrangement of strippers 30 and pick-up tools 24 results in a comb-like structure, in the interstices of which the tines 34 of the pick-up tools 24 rotate with only a small distance between tines 34 and strippers 30 and thus convey the harvested material along said strippers 30 and into the collection zone.

Figure 2:
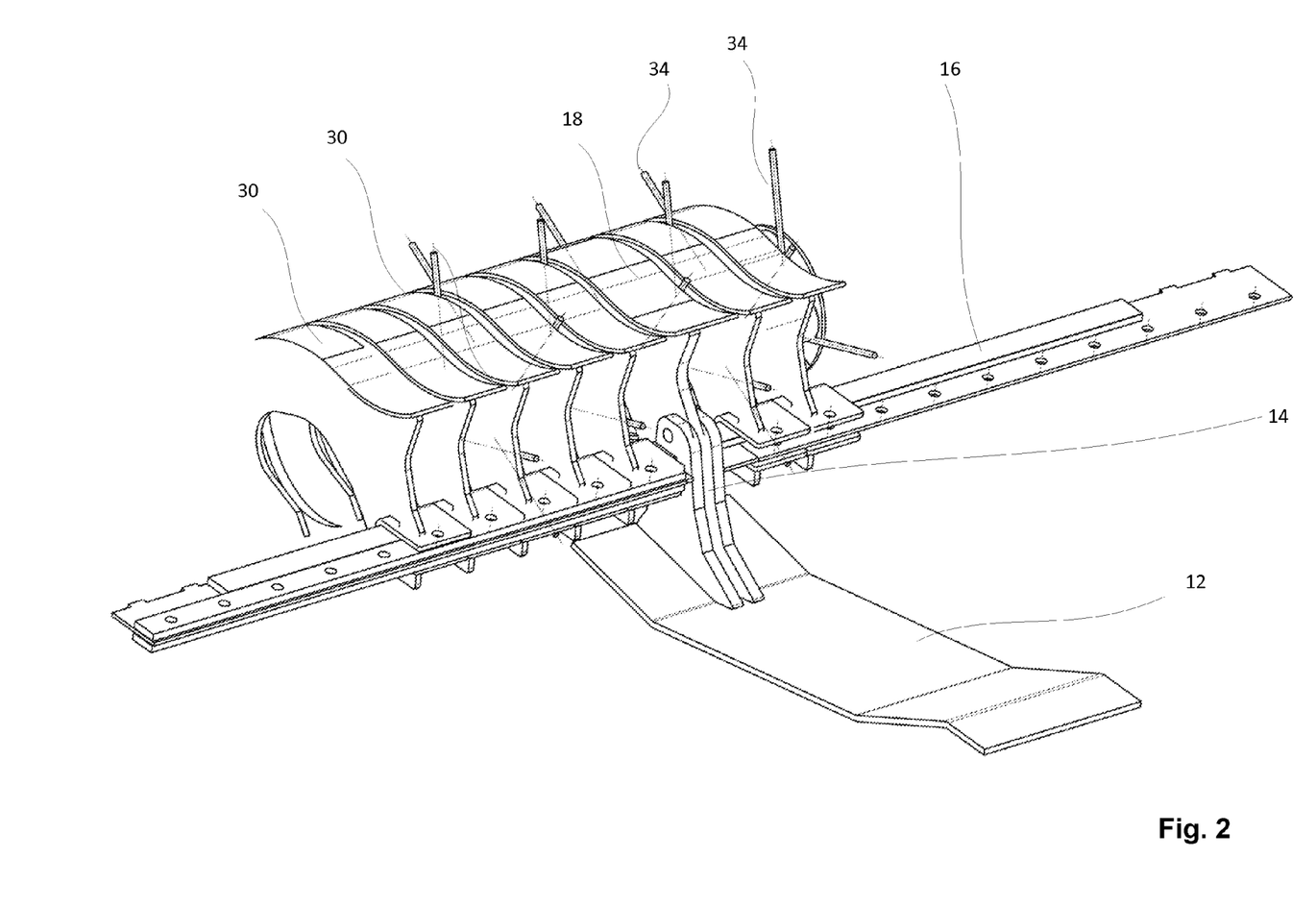
FIG. 2 a perspective detailed view of the yoke of the collector for harvested material according to the present invention.

FIG. 2 is an enlarged detail of the collector 10 for harvested material of the present invention, which shows a skid 12 which is connected to the yoke 16 and the supporting element 18 via its bearing bracket 14. As can clearly be seen in this view, the strippers 30 are individually mounted on said yoke 16. Mounting them individually will preserve the flexibility of the yoke and at the same time ensure stable attachment of the individual strippers 30.

Advantageously, the individual strippers 30 are connected to the flat section in a form-locking manner via a U-shaped recess. In order to also firmly mount them in the direction of travel, they can also be screwed to the yoke 16. The strippers 30 are designed so as to loosely surround the shaft 22, thus ensuring that the shaft 22 can freely rotate without hitting the strippers 30.

Figure 3:
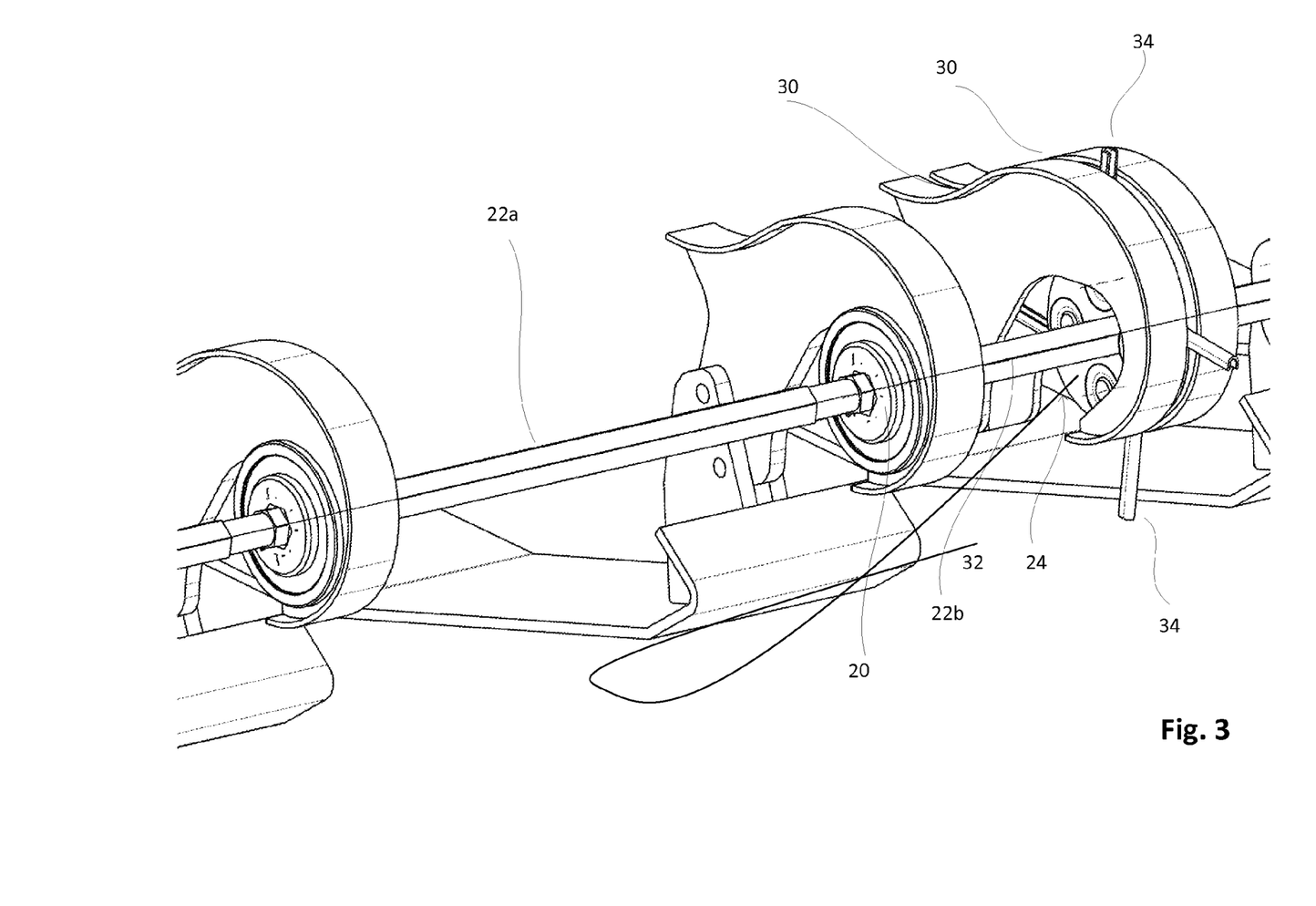
FIG. 3 a perspective detailed view of the shaft of the collector for harvested material according to the present invention.

FIG. 3 is a perspective view of the collector 10 for harvested material in which a hexagonal shaft 22 extends through the shaft bushings 20 pressed into the supporting elements 18.

This view shows the pick-up tool 24 very clearly. The latter essentially comprises a tined disk 32 which has spring-loaded tines 34 projecting from along its periphery. The tined disk 32 itself has a hexagonal opening to match the design of the shaft 22 through which the hexagonal shaft 22 extends in a form-locking manner. It can clearly be seen in this view that the shaft 22 is formed of individual shaft parts 22a, 22b. Especially for pick-up tools 24 that can only be slid onto the shaft, this has the advantage that whenever such a tool needs to be repaired or replaced, only certain individual segments of the shaft will have to be removed.

Figure 4:
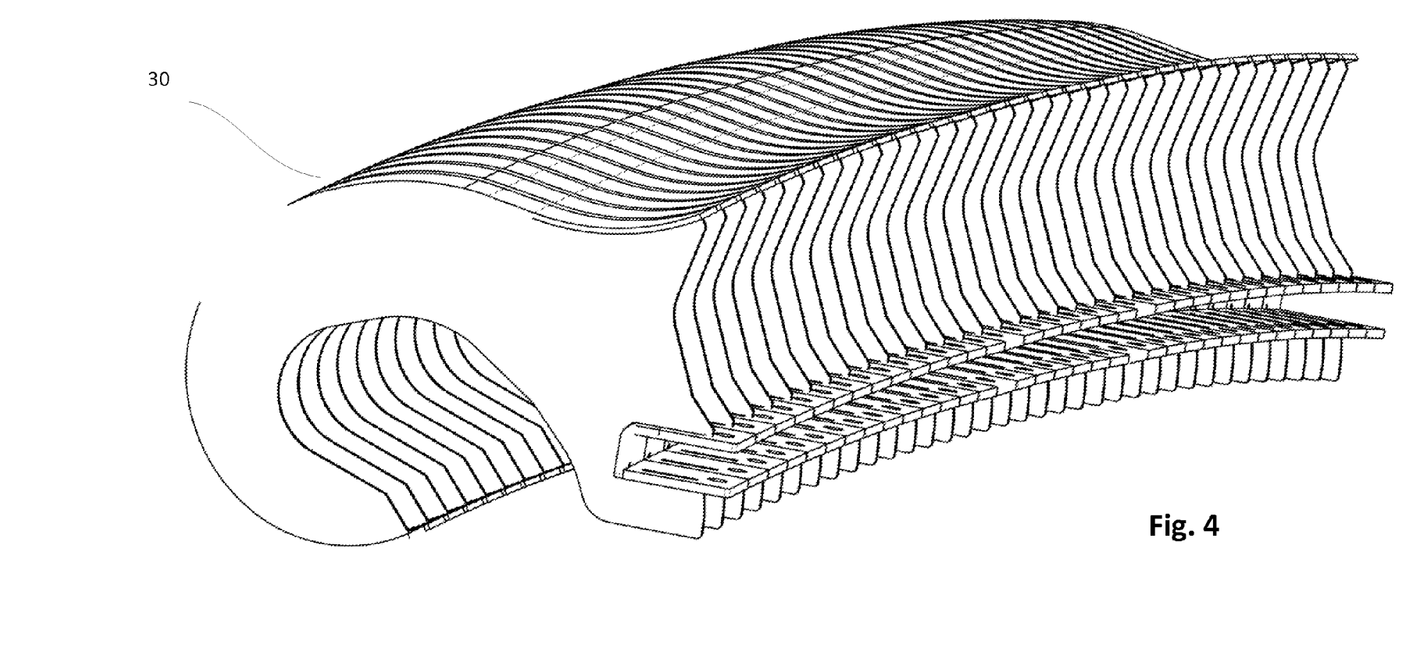
FIG. 4 a perspective view of the strippers of the collector for harvested material according to the present invention.

FIG. 4 is a top view of the collector for harvested material from which all components have been removed except for the strippers 30. This view is an excellent illustration of the arc-shaped elastic deformation of the collector when the skids 12 are vertically displaced.

Figure 5:
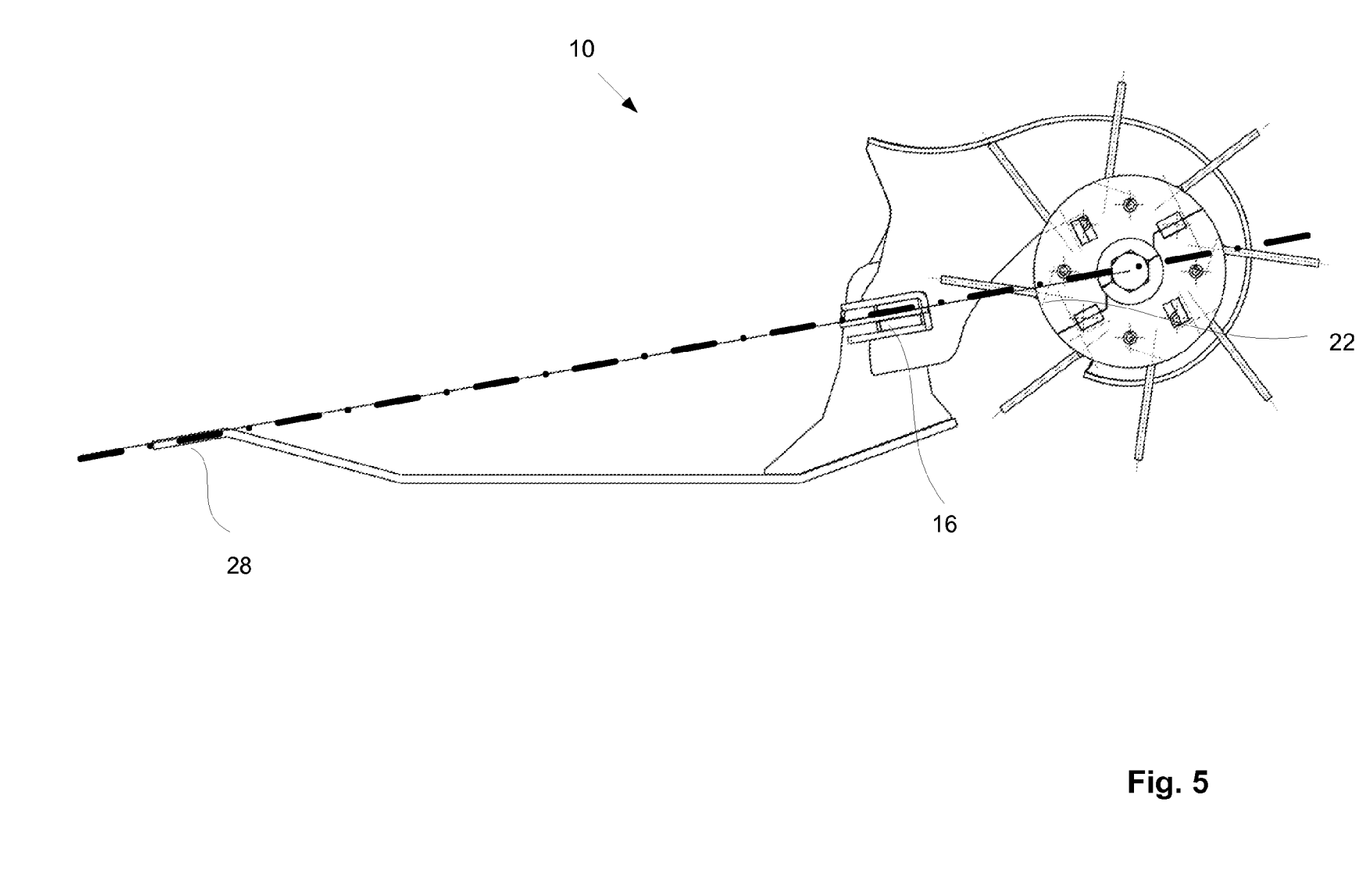
FIG. 5 a schematic lateral view of a collector for harvested material.

FIG. 5 is a schematic lateral view of a collector 10 of harvested material of FIG. 1. It can clearly be seen from this view that the shaft 22, the yoke 16 and the stabilizer 28 all extend in the same plane. This affords additional stabilization of the collector both in and transversely to its direction of travel, and at the same time allows it to deform in the vertical direction, thus ensuring optimal following of the ground contours.

Figure 6:
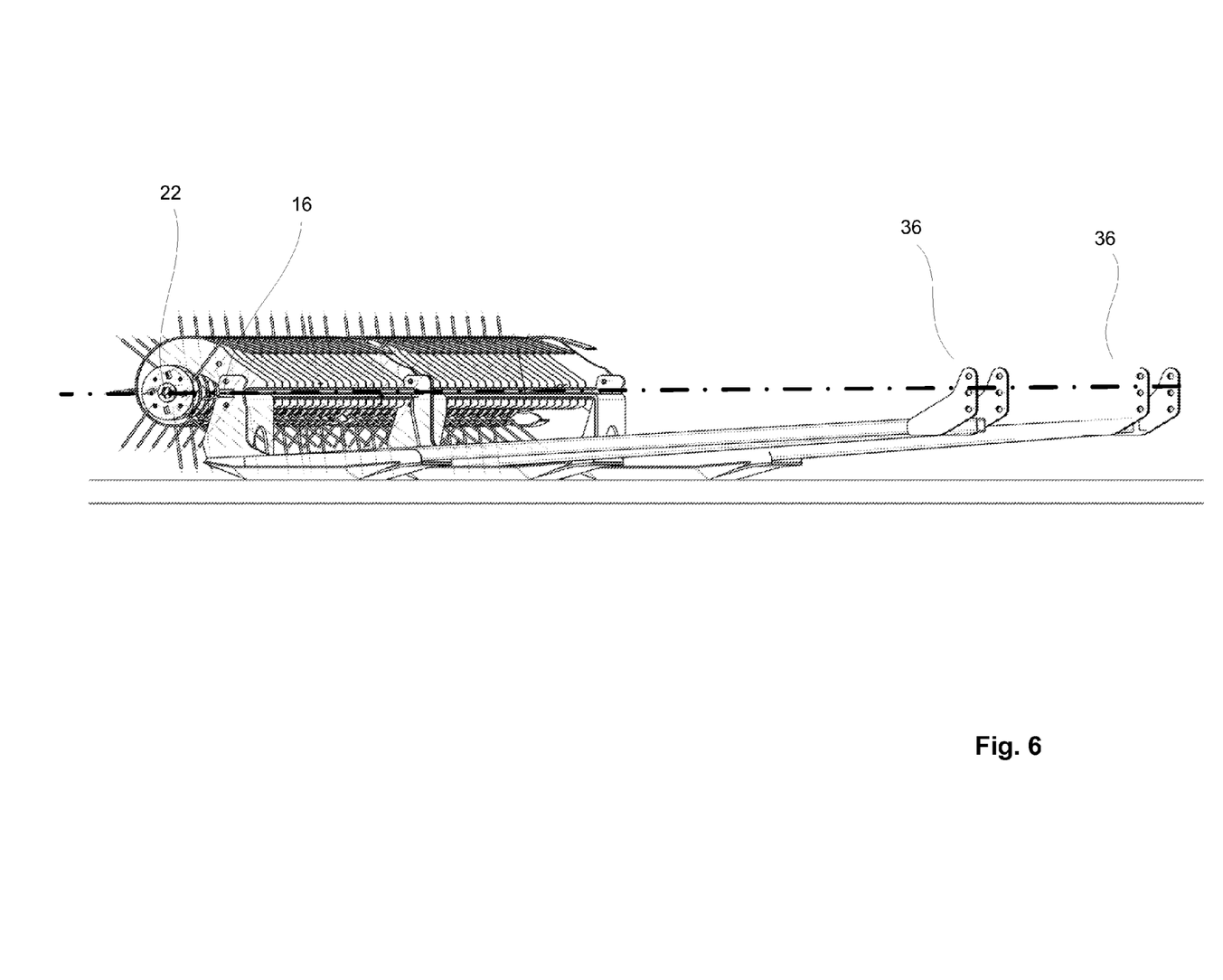
FIG. 6 an illustration of a collector for harvested material.

FIG. 6 is an illustration of a collector for harvested material which uses a connector 36 for mounting it on a fixed frame which will stabilize it appropriately. The dotted line here also clearly shows that the connector 36 act to stabilize the collector but still allow a deformation in the vertical direction, since the shaft 22 and the yoke 16 extend in the same plane as the connector.

LIST OF REFERENCE SIGNS 10 collector for harvested material 12 skid 14 bearing bracket
16 yoke
18 supporting element
20 shaft bushing
22 shaft
22a shaft part
22b shaft part
24 pick-up tool
26 segment
28 stabilizer
30 stripper
32 tined disk
34 tines

The invention claimed is:

1. A collector for collecting harvested material comprising:
- at least three movement devices and at least one yoke interconnecting said movement devices;
- supporting elements connected to said yoke and said movement devices which include a shaft bushing, a shaft, supported by the shaft bushing being connected to pick-up tools for picking up harvested material,
- wherein at least one additional movement device is provided between two outer movement devices, said yoke being elastically deformable for allowing a relative movement of said additional movement device with respect to said two outer movement devices in a vertical direction relative to an axis of said yoke, wherein said yoke being elastically deformable likewise allows relative movement of said bushing of said at least one additional movement device with respect to said two outer movement devices in said vertical direction relative to said axis of said yoke.

2. The collector of claim 1, wherein the supporting elements are mounted on said yoke and/or on said movement devices.

3. The collector of claim 1 wherein said yoke is elastically deformable to an extent which allows said yoke to bend by at least 2 cm in a central position of said yoke, having a total length of 3 m in a vertical direction relative to the yoke axis.

4. The collector of claim 1, wherein a single elastically deformable yoke interconnects said movement devices.

5. The collector of claim 1, wherein the elastic deformability of said yoke is determinable by adjustment of a cross section and material thereof.

6. The collector of claim 1, wherein the shaft is an elastically deformable shaft.

7. The collector of claim 1, wherein the shaft is assembled from individual shaft parts.

8. The collector of claim 1, further comprising strippers mounted on said yoke, located between axially adjacent pick-up tools.

9. The collector of claim 8, wherein said strippers are mounted on said yoke individually or in groups.

10. The collector of claim 1, wherein said pick-up tools are mounted on said shaft individually or in groups.

11. The collector of claim 1, wherein said yoke is in the form of a flat section.

12. The collector of claim 1, wherein said yoke is in the form of a multi-layer flat section.

13. The collector of claim 1, wherein said movement devices are interconnected by a stabilizer.

14. The collector of claim 1, wherein said pick-up tools are tined disks having a plurality of tines.

15. The collector of claim 1, further comprising a frame for guiding said collector having at least one support point, and wherein said shaft, said yoke and the at least one support point of the frame extend substantially in a same plane.

16. The collector of claim 1, further comprising a stabilizer that interconnects said movement devices which extends substantially in a same plane as said shaft and said yoke.

* * * * *